(12) United States Patent
Welschof et al.

(10) Patent No.: US 6,390,928 B1
(45) Date of Patent: May 21, 2002

(54) DRIVESHAFT ADAPTED TO A PREFERRED TORQUE TRANSMITTING DIRECTION

(75) Inventors: Hans-Heinrich Welschof, Rodenbach; Thomas Schäffner, Langen; Joachim Prölb, Gross-Zimmern; Peter Schwärzler, Glattbach, all of (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/636,346

(22) Filed: Aug. 10, 2000

(30) Foreign Application Priority Data

Aug. 16, 1999 (DE) .......................................... 199 38 771

(51) Int. Cl.⁷ .............................................. F16D 3/224
(52) U.S. Cl. ........................ 464/140; 464/145; 464/906
(58) Field of Search ................................ 464/145, 167, 464/168, 179, 182, 906, 140

(56) References Cited

U.S. PATENT DOCUMENTS

| | | | |
|---|---|---|---|
| 4,255,943 A | * 3/1981 | Kobayashi | 464/906 X |
| 5,451,185 A | * 9/1995 | Krude et al. | 464/145 |
| 5,611,733 A | * 3/1997 | Jabob et al. | 464/906 X |
| 5,624,318 A | * 4/1997 | Jacob et al. | 464/145 X |
| 6,217,456 B1 | * 4/2001 | Jacob | 464/906 X |

FOREIGN PATENT DOCUMENTS

| | | |
|---|---|---|
| DE | 22 52 827 | 5/1974 |
| DE | 22 22 670 | 12/1976 |
| DE | 27 17 936 | 12/1979 |
| GB | 2 107 655 A | 5/1978 |

* cited by examiner

Primary Examiner—Lynne H. Browne
Assistant Examiner—Greg Binda (57) ABSTRACT

A driveshaft (11) having two ball type constant velocity fixed joints (12, 13), a shaft part (14) connecting said two joints, and an axial plunging part (15) arranged in said shaft part (14). The ball type constant velocity fixed joints (12, 13) each comprise: a bell-shaped outer joint part (16, 26) provided with internally positioned first ball tracks (18, 28); a hub-shaped inner joint part (19, 29) provided with externally positioned second ball tracks (21, 31) and arranged inside said outer joint part (16, 26); balls (24, 34) engaging pairs of first ball tracks (18, 28) and second ball tracks (21, 31); and an annular ball cage (22, 32) with circumferentially distributed cage windows in which the balls are held in a common plane. The pairs of first ball tracks (18, 28) and second ball tracks (21, 31), when viewed in a longitudinal section, form opening angles ($\alpha_{12}$, $\alpha_{13}$) relative to one another for controlling the balls (24, 34) in the ball tracks. The opening angles ($\alpha_{12}$, $\alpha_{13}$) of the pairs of first ball tracks and second ball tracks at both ball type constant velocity fixed joints (12, 13) open in the same direction.

7 Claims, 5 Drawing Sheets

DRIVESHAFT ADAPTED TO A PREFERRED TORQUE TRANSMITTING DIRECTION

BACKGROUND OF THE INVENTION

The invention relates to a driveshaft with two ball type constant velocity fixed joints, a shaft part connecting said two joints, and an axial plunging part arranged in the shaft part.

Driveshafts of said type are predominantly used as sideshafts in the drivelines of motor vehicles. At the input end, they are connected to the differential drive of an axle and, at the output end, to a wheel hub of a driving wheel. The two ball type constant velocity fixed joints are always arranged symmetrically in that the outer joint parts with adjoining journals are located at the outer ends. Said journals can then be easily inserted into the differential drive and into the wheel hub respectively. The convoluted boots for sealing the open annular chambers of the ball type constant velocity joints, which boots require a certain axial length, come to rest on the inside of the shaft, so that the joint centers can move closely to the differential drive on the one hand and to the wheel hub on the other hand, so that large effective shaft lengths between the joint centers of the ball type constant velocity fixed joints can be utilized. In steered front axles, the load spectra differ considerably in respect of the articulation angles because the inner joints in the sideshafts only compensate for compression movements, whereas the outer joints in the sideshafts additionally have to effect steering angles. However, in unsteered rear axles, the load spectra at the inner joints and at the outer joints are approximately the same because in each case, only the compression movements of the wheels have to be compensated for, with the wheel camber remaining substantially unchanged. Regardless of the above, it has been found that the service life values of the joints in the inner and outer sideshafts, and of the inner joints at the differential, vary considerably, with the latter being at a disadvantage.

An example of a ball type constant velocity fixed joint is disclosed in DE-PS-1126199 and an example of an undercut-free joint is disclosed in DE 22 52 827 C3. Other examples of constant velocity fixed joints are shown in DE 25 22670 C2 or DE 2717 936 C3.

SUMMARY OF THE INVENTION

It is therefore an object of the invention to provide driveshafts wherein both ball type constant velocity fixed joints, while having substantially identical load spectra, feature very similar service life values while comprising comparable sizes.

The objective is achieved by a driveshaft having two ball type constant velocity fixed joints. The ball type constant velocity fixed joints each comprise: a bell-shaped outer joint part provided with internally positioned first ball tracks; a hub-shaped inner joint part provided with externally positioned second ball tracks and arranged inside the outer joint part; balls engaging pairs of first ball tracks and second ball tracks; and an annular ball cage with circumferentially distributed cage windows in which the balls are held in a common plane. The pairs of first ball tracks and second ball tracks, when viewed in a longitudinal section, form opening angles with to one another for controlling the balls in the ball tracks. In addition, the opening angles of the pairs of first ball tracks and second ball tracks at both ball type constant velocity fixed joints open in the same direction.

It has been found that the relation of the opening angles of the ball hub in the longitudinal section relative to the torque transmitting direction affects the service life of the ball type constant velocity joint, so that the service life values of both ball type constant velocity joints of the driveshaft are adapted to one another if the opening angles at both ball type constant velocity joints correspond to one another. A longer service life is obtained if the direction of opening of the opening angle and the preferred torque transmitting direction are oppositely directed, so that, in accordance with the invention, the shaft has to be mounted in that sense if a preferred torque transmitting direction prevails in the load spectrum, which is of course always the case in the driveline of a motor vehicle.

According to a first preferred embodiment, the bell-shaped outer joint parts extend in the same direction relative to the hub-shaped inner joint parts, with each of the opening angles opening towards the open ends of the bell-shaped outer joint parts.

Both ball type constant velocity fixed joints can be provided in the form of undercut-free joints. One of the joints opens towards the shaft end, so that the shortest possible convoluted boots or rolling boots should be used in order not to shorten the effective shaft length between the joint centers.

According to a second embodiment, relative to the hub-shaped inner joint parts, the bell-shaped outer joint parts are arranged symmetrically relative to one another, especially so as to be positioned towards the outer end of each respective driveshaft, with the opening angle at one of the ball type constant velocity fixed joints opening towards the closed end of the bell-shaped outer joint part.

The attaching journals at the outer joint parts can be integrally formed on to the latter, or an attaching journal can be produced so as to be integral with a base part of an outer joint part, which base part, in the course of production, is welded to an outer annular member of the outer joint part, especially by friction welding. This is particularly advantageous if the opening angles of the tracks open towards the closed end, i.e., the base of the outer joint part. The attaching journals at the inner joint parts or for the inner joint parts are preferably provided in the form of plug-in journals which are form-fittingly and positively connected to the hub-shaped inner joint parts.

Furthermore, according to a preferred embodiment, the inwardly positioned attaching journals of the ball type constant velocity fixed joints are directly welded to an inner journal of the axial plunging element on the one hand and to a sleeve of the axial plunging element on the other hand. In particular, there is provided a convoluted boot which simultaneously extends over and seals the annular opening of one of the ball type constant velocity fixed joints and the annular opening of the plunging element in that one collar of the convoluted boot is positioned on the outer joint part of the ball type constant velocity fixed joint and in that the other collar of the convoluted boot is positioned on the sleeve of the axial plunging element.

The use of shafts in accordance with the invention on the basis of the above mentioned characteristics and features consists in that the ball type constant velocity fixed joints are mounted in such a way that the opening angles open in the direction opposed to the preferred torque transmitting direction.

Other objects and advantages of the invention will become apparent upon reading the following detailed description and appended claims and upon reference to the accompanying drawings.

Preferred embodiments of inventive driveshafts will be described below in comparison to a driveshaft according to the state of the art.

BRIEF DESCRIPTION OF THE DRAWINGS

For a more completed understanding of the invention, reference should be made to the embodiments illustrated in greater detail in the accompanying drawings and described below by way of examples of the invention.

In the drawings.

DETAILED DESCRIPTION OF THE INVENTION

Figure 1:
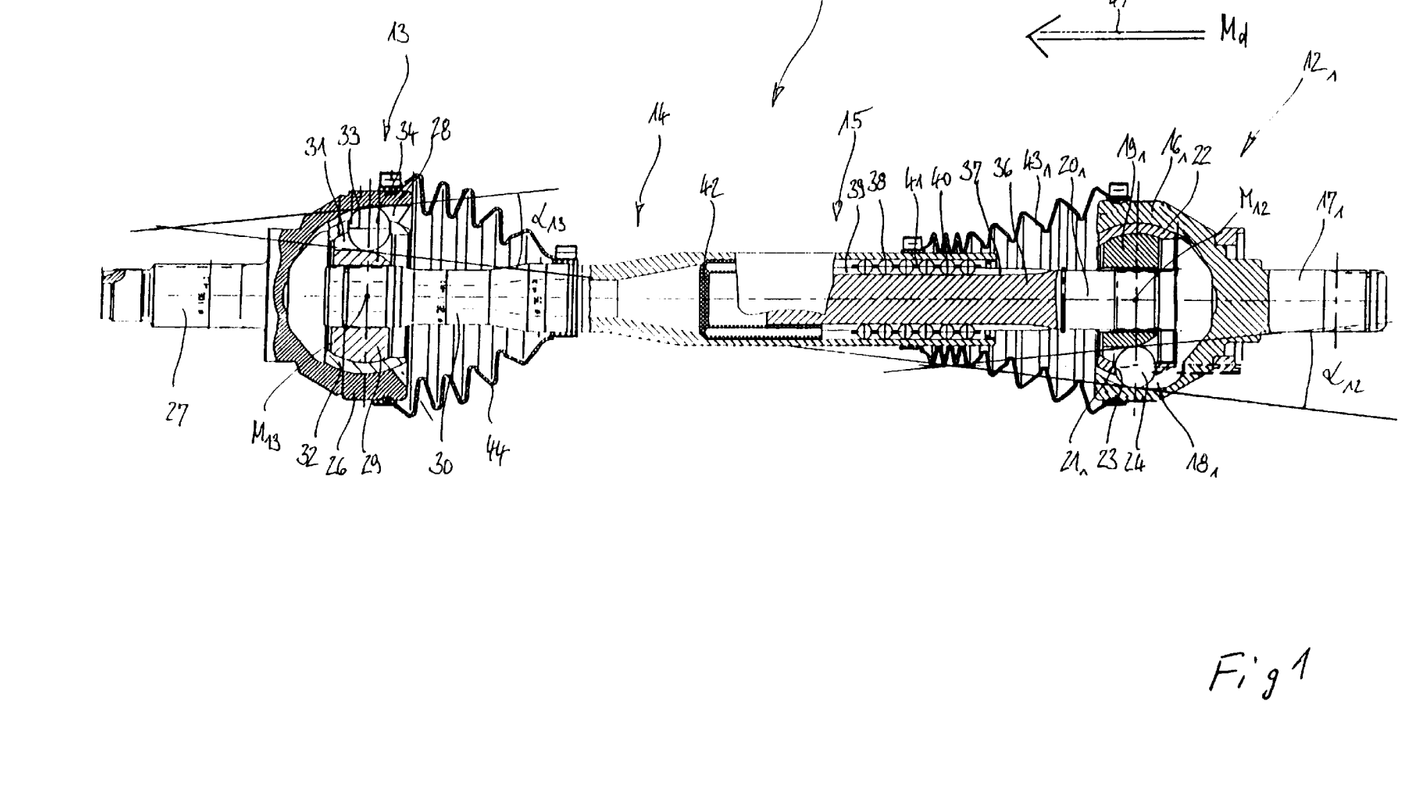
FIG. 1 shows a driveshaft with symmetrically arranged outer joint parts and inner joint parts according to one embodiment of the present invention.

FIG. 1 is a longitudinal section of a driveshaft 11 having a first ball type constant velocity fixed joint $12_1$, a second ball type constant velocity fixed joint 13 and a shaft part 14 connecting said two joints. Inside the shaft part 14, there is arranged an axial plunging part 15 which permits changes in length if there occurs a change in the distance between the joint center $M_{12}$ of the first ball type constant velocity joint and the joint center $M_{13}$ of the second ball type constant velocity joint. The first ball type constant velocity fixed joint $12_1$ is provided with a bell-shaped outer joint part $16_1$ with an integrally formed-on attaching journal $17_1$ and first inner ball tracks $18_1$. Furthermore, the first ball type constant velocity fixed joint $12_1$ is provided with an inner joint part $19_1$ with an inserted shaft journal $20_1$ and second outer ball tracks $21_1$. A ball cage 22 is also included which rests annularly between said outer joint part and inner joint part and which, in circumferentially distributed cage windows 23, receives the torque transmitting balls 24 which each engage pairs of first ball tracks and second ball tracks. The pairs of ball tracks $18_1$, $21_1$, in a longitudinal section, form opening angles $\alpha_{12}$ with one another, which are represented by the tangents at the balls 24 and which open towards the closed base of the outer joint part $16_1$.

The second ball type constant velocity fixed joint 13 is provided with a bell-shaped outer joint part 26 with an integrally formed-on shaft journal 27 and first inner ball tracks 28. The second ball type constant velocity fixed joint 13 also includes an inner joint part 29 with an inserted journal 30 and outer second ball tracks 31, and a ball cage 32 which rests annularly between said outer joint part and inner joint part and which, in circumferentially distributed cage windows 33, receives the torque transmitting balls 34 which each engage pairs of first ball tracks and second ball tracks. The pairs of ball tracks 28, 31, in a longitudinal section, form opening angles $\alpha_{13}$ with each other, which are represented by the tangents on the balls 34 and which open towards the open end of the bell-shaped outer joint part 26.

An inner journal 36 of the plunging element 15 is welded to the journal $20_1$ of the first ball type constant velocity fixed joint 12 and comprises outer ball grooves 37. The inner journal 36 engages a sleeve part 38 in which there are provided inner ball grooves 39.

A plurality of balls 40 each engage pairs of axially extending ball grooves 37, 39 and are held at identical distances from one another by a ball cage 41. A double-walled closing cap 42 is placed on to the end of the inner journal 36 and is axially supported in the sleeve part 38. The sleeve part 38 is welded to the journal 30 of the second ball type constant velocity joint 13.

A first convoluted boot $43_1$ is positioned on the outer joint part 16 of the first ball type constant velocity fixed joint $12_1$, on the one hand, and on the sleeve 38 of the axial plunging part 15, on the other hand. It thus closes the open annular chambers of the first ball type constant velocity fixed joint $12_1$ and of the plunging part 15.

A second convoluted boot 44 is positioned on the outer joint part 26 of the second ball type constant velocity fixed joint 13, on the one hand, and on the plug-in journal 30 of the same joint and closes its open annular chamber.

The opening angles $\alpha_{12}$, $\alpha_{13}$ of both ball type constant velocity fixed joints, in accordance with the invention, open in the same direction; they open in the direction opposed to the preferred torque transmitting direction indicated by the arrow 47. The inner joint parts and outer joint parts of both ball type constant velocity fixed joints are arranged symmetrically relative to one another, with the outer joint parts $16_1$, 26 being positioned at the respective outer ends of the driveshaft 11, so that the attaching journal $17_1$ can be inserted into a differential drive for example and the attaching journal 27 into a wheel hub.

Figure 2:
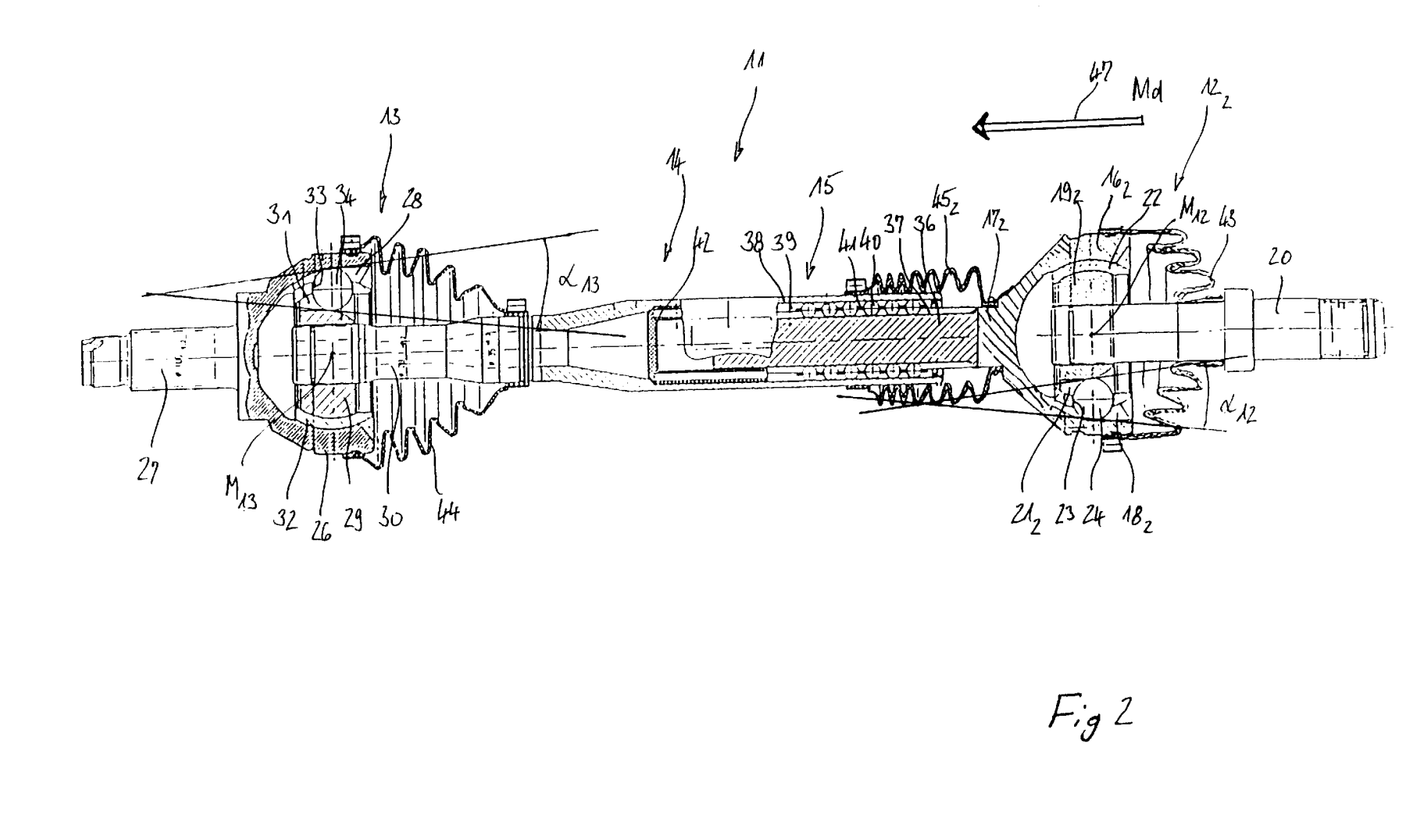
FIG. 2 shows a driveshaft according to another embodiment of the present invention, wherein the inner joint parts and outer joint parts are arranged so as to extend in the same direction.

FIG. 2 is a longitudinal section of a driveshaft 11 having a first ball type constant velocity fixed joint $12_2$, a second ball type constant velocity fixed joint 13 and a shaft part 14 connecting said two joints. Inside the shaft part 14, there is arranged an axial plunging part 15 which permits changes in length if there occurs a change in the distance between the joint center $M_{12}$ of the first ball type constant velocity joint and the joint center $M_{13}$ of the second ball type constant velocity joint.

The first ball type constant velocity fixed joint $12_2$ is provided with a bell-shaped outer joint part $16_2$ with an integrally formed-on attaching journal $17_2$ and first inner ball tracks $18_2$. It also includes an inner joint part $19_2$ with an inserted shaft journal 20 and second outer ball tracks $21_2$, and a ball cage 22 which rests annularly between said outer joint part and inner joint part and which, in circumferentially distributed cage windows 23, receives the torque transmitting balls 24 which each engage pairs of first ball tracks and second ball tracks. The pairs of ball tracks $18_2$, $21_2$, in a longitudinal section, form opening angles $\alpha_{12}$ with one another, which are represented by the tangents at the balls 24 and which open towards the open end of the outer joint part $16_2$.

The second ball type constant velocity fixed joint 13 is provided with a bell-shaped outer joint part 26 with an integrally formed-on shaft journal 27 and first inner ball tracks 28. It also includes an inner joint part 29 with an inserted journal 30 and outer second ball tracks 31, and a ball cage 32 which rests annularly between said outer joint part and inner joint part and which, in circumferentially distributed cage windows 33, receives the torque transmitting balls 34 which each engage pairs of first ball tracks and second ball tracks. The pairs of ball tracks 28, 31, in a longitudinal section, form opening angles $\alpha_{13}$ with each other, which are represented by the tangents on the balls 34 and which open towards the open end of the bell-shaped outer joint part 26.

An inner journal 36 of the plunging element 15 is welded to the journal $17_2$ of the first ball type constant velocity fixed joint $12_2$ and comprises outer ball grooves 37. The inner journal 36 engages a sleeve part 38 in which there are provided inner ball grooves 39.

A plurality of balls 40 each engage pairs of axially extending ball grooves 37, 39 and are held at identical distances from one another by a ball cage 41.

A double-walled closing cap 42 is placed on to the end of the inner journal 36 and is axially supported in the sleeve part 38. The sleeve part 38 is welded to the journal 30 of the second joint 13.

A first convoluted boot 43 is positioned on the outer joint part $16_2$ of the first ball type constant velocity fixed joint $12_2$, on the one hand, and on the plug-in journal $20_2$ and thus closes the open annular chamber of the first ball type constant velocity fixed joint $12_2$. A second convoluted boot 44 is positioned on the outer joint part 26 of the second ball type constant velocity fixed joint 13, on the one hand, and on the plug-in journal 30 of the same joint, on the other hand, and closes the open annular chamber of same.

Finally, a third convoluted boot $45_2$ is positioned on the journal $17_2$ of the first ball type constant velocity fixed joint $12_2$, on the one hand, and on the sleeve 38 of the plunging part 15, on the other hand, and closes the annular chamber 22 of the plunging part 15. The opening angles $\alpha_{12}$, $\alpha_{13}$ of both ball type constant velocity fixed joints, in accordance with the invention, open in the same direction; they open in the direction opposed to the preferred torque transmitting direction indicated by the arrow 47. The inner joint parts and outer joint parts of both ball type constant velocity fixed joints are arranged so as to extend in the same direction so that the plug-in journal 20 can be inserted into a differential drive for example and the attaching journal 27 into a wheel hub.

Figure 3:
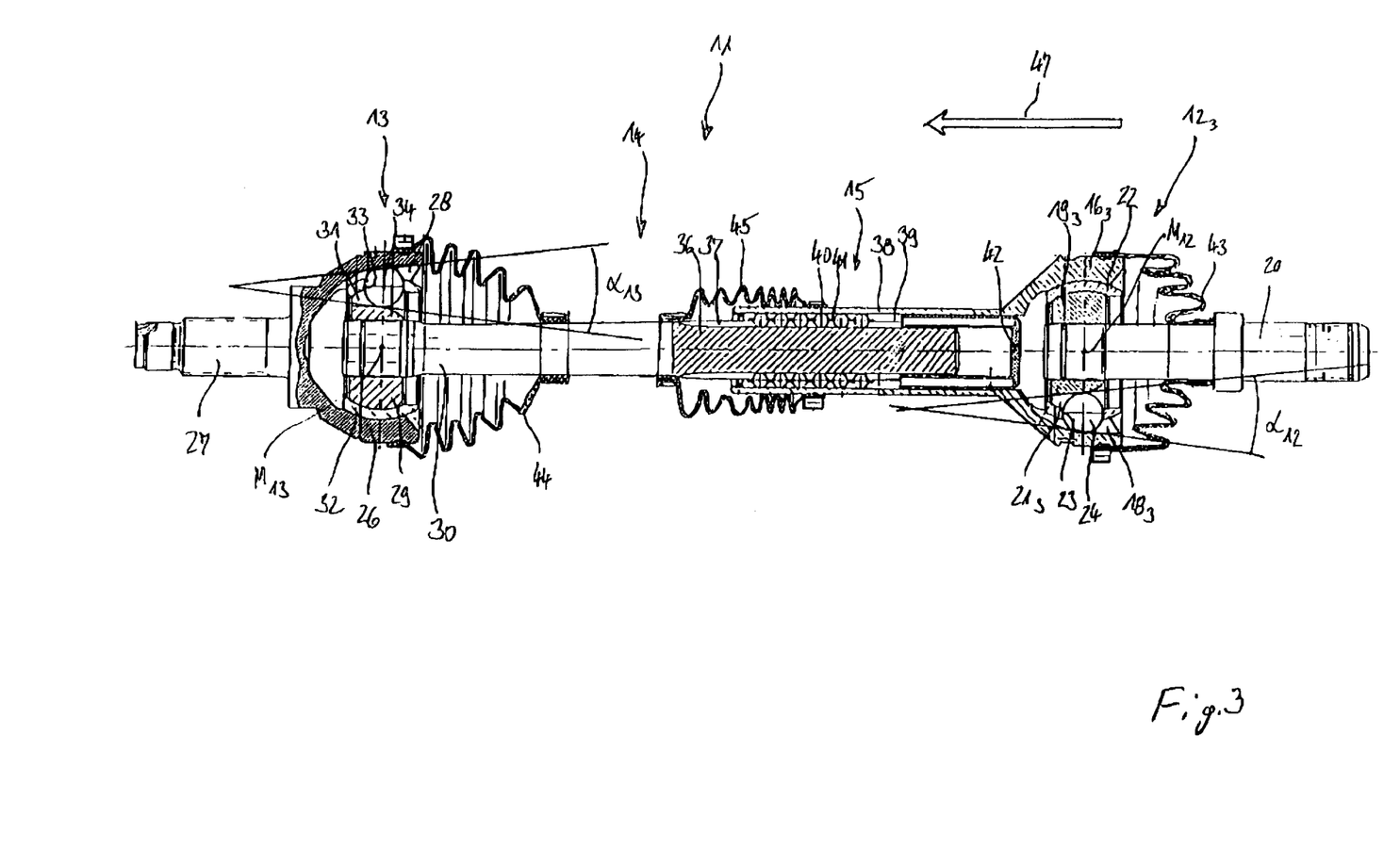
FIG. 3 shows a driveshaft according to a further embodiment, wherein the inner joint parts and outer joint parts are arranged so as to extend in the same direction.
Figure 4:
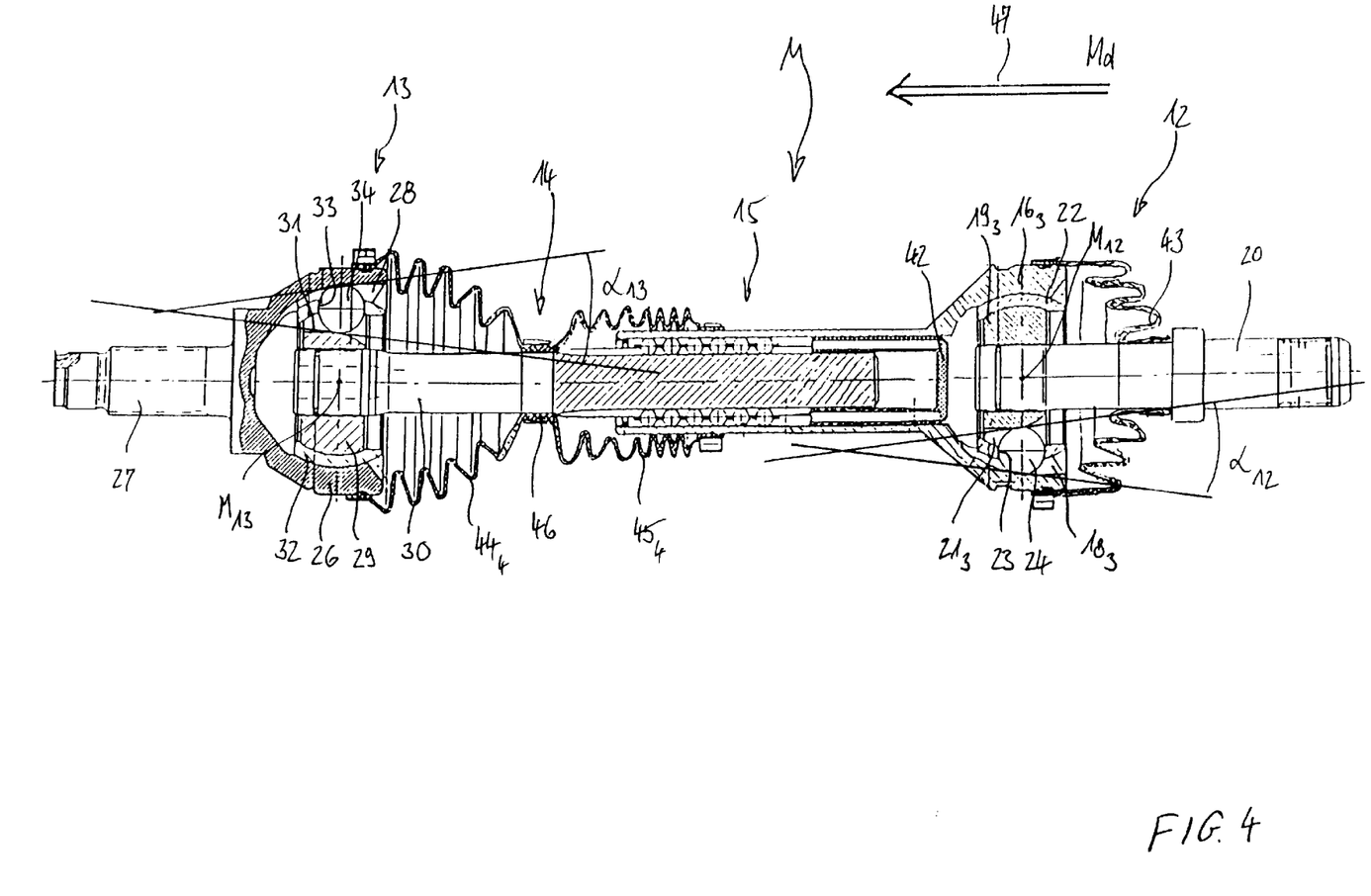
FIG. 4 shows a driveshaft according to a further embodiment, wherein the inner joint parts and outer joint parts are arranged so as to extend in the same direction.

FIGS. 3 and 4 each show a longitudinal section of a driveshaft 11 having a first ball type constant velocity fixed joint $12_3$, a second ball type constant velocity fixed joint 13 and a shaft part 14 connecting said two joints. Inside the shaft part 14, there is arranged an axial plunging part 15 which permits changes in length if there occurs a change in the distance between the joint center $M_{12}$ of the first ball type constant velocity fixed joint and the joint center $M_{13}$ of the second ball type constant velocity fixed joint. The first ball type constant velocity fixed joint $12_3$ is provided with a bell-shaped outer joint part $16_3$ with first inner ball tracks $18_3$, and, furthermore, with an inner joint part $19_3$ with an inserted shaft journal 20 and second outer ball tracks $21_3$. It also includes a ball cage 22 which rests annularly between said outer joint part and inner joint part and which, in circumferentially distributed cage windows 23, receives the torque transmitting balls 24 which each engage pairs of first ball tracks and second ball tracks. The pairs of ball tracks $18_3$, $21_3$, in a longitudinal section, form opening angles $\alpha_{12}$ with one another, which are represented by the tangents at the balls 24 and which open towards the open end of the outer joint part $16_3$.

The second ball type constant velocity fixed joint 13 is provided with a bell-shaped outer joint part 26 with an integrally formed-on shaft journal 27 and first inner ball tracks 28, and, furthermore, with an inner joint part 29 with an inserted journal 30 and outer second ball tracks 31. It also includes a ball cage 32 which rests annularly between said outer joint part and inner joint part and which, in circumferentially distributed cage windows 33, receives the torque transmitting balls 34 which each engage pairs of first ball tracks and second ball tracks. The pairs of ball tracks 28,31, in a longitudinal section, form opening angles $\alpha_{13}$ with each other, which are represented by the tangents on the balls 34 and which open towards the open end of the bell-shaped outer joint part 26.

An inner journal 36 of the plunging element 15 is welded to the journal 30 of the second ball type constant velocity fixed joint 13 and comprises outer ball grooves 37. The inner journal 36 engages a sleeve part 38 in which there are provided inner ball grooves 39. The sleeve part 38 is directly welded to the outer joint part $16_3$ of the first ball type constant velocity fixed joint $12_3$. A plurality of balls 40 each engage pairs of axially extending ball grooves 37, 39 and are held at identical distances from one another by a ball cage 41. A double-walled closing cap 42 is placed on to the end of the inner journal 36 and closes the ball type constant velocity fixed joint 12.

The opening angles $\alpha_{12}$, $\alpha_{13}$ of both joints, in accordance with the invention, open in the same direction, i.e. they open in the direction opposed to the preferred torque transmitting direction indicated by the arrow 47. The inner joint part and the outer joint parts of both joints are arranged so as to extend in the same direction, so that the plug-in journal 20 can be inserted into a differential drive for example and the attaching journal 27 into a wheel hub.

In FIG. 3, a first convoluted boot 43 is positioned on the outer joint part $16_3$ of the first ball type constant velocity fixed joint $12_3$, on the one hand, and on the plug-in journal 20, on the other hand, and thus closes the open annular chamber of the first ball type constant velocity fixed joint 12. A second convoluted boot 44 is positioned on the outer joint part of the second ball type constant velocity fixed joint 13, on the one hand, and on the plug-in journal 30 of the same joint and closes the open annular chamber of same. Finally, a third convoluted boot 45 is positioned on the journal 30 of the second ball type constant velocity fixed joint 13, on the one hand, and on the sleeve 38 of the plunging part 15, on the other hand, and closes the annular chamber 22 of the plunging part 15. In FIG. 4, the convoluted boots $44_4$, $45_4$ are connected by a common central portion 46 which is secured on the journal 30.

Figure 5:
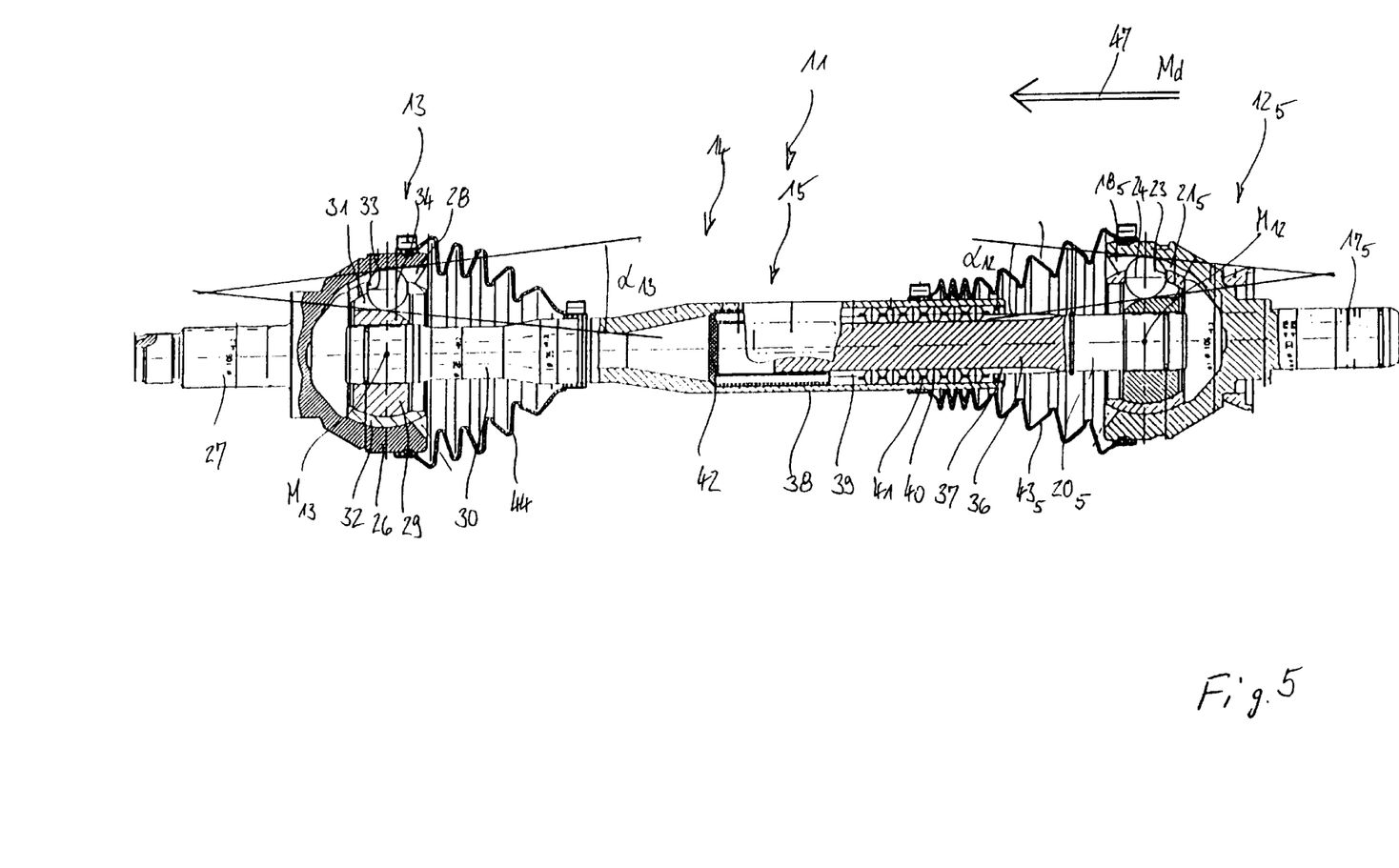
FIG. 5 shows a driveshaft according to another embodiment, wherein the inner joint parts and outer joint parts are arranged symmetrically.

FIG. 5 shows a longitudinal section of a driveshaft 11 having a first ball type constant velocity fixed joint $12_5$, a second ball type constant velocity fixed joint 13 and a shaft part 14 connecting said two joints. Inside the shaft part 14, there is arranged an axial plunging part 15 which permits changes in length if there occurs a change in the distance between the joint center $M_{12}$ of the first ball type constant velocity fixed joint and the joint center $M_{13}$ of the second ball type constant velocity fixed joint. The first ball type constant velocity fixed joint $12_5$ is provided with a bell-shaped outer joint part $16_5$ with an integrally formed-on attaching journal $17_5$ and first inner ball tracks $18_5$, and, furthermore, with an inner joint part $19_5$ with an inserted shaft journal $20_5$ and second outer ball tracks $21_5$. It also includes a ball cage 22 which rests annularly between said outer joint part and inner joint part and which, in circumferentially distributed cage windows 23, receives the torque transmitting balls 24 which each engage pairs of first ball tracks and second ball tracks. The pairs of ball tracks $18_5$, $21_5$, in a longitudinal section, form opening angles $\alpha_{12}$ with one another, which are represented by the tangents at the balls and which open towards the inner open end of the outer joint part 16, which inner open end rests against the shaft.

The second ball type constant velocity fixed joint 13 is provided with a bell-shaped outer joint part 26 with an integrally formed-on shaft journal 27 and first inner ball tracks 28, and, furthermore, with an inner joint part 29 with an inserted journal 30 and outer second ball tracks 31. It also includes a ball cage 32 which rests annularly between said outer joint part and inner joint part and which, in circumferentially distributed cage windows 33, receives the torque transmitting balls 34 which each engage pairs of first ball tracks and second ball tracks. The pairs of ball tracks 28, 31, in a longitudinal section, form opening angles $\alpha_{13}$ with each other, which are represented by the tangents on the balls and which open towards the inner open end of the bell-shaped outer joint part 26, which inner open end rests against the shaft.

An inner journal 36 of the plunging element 15 is welded to the journal $20_5$ of the first constant velocity fixed ball joint 12 and comprises outer ball grooves 37. The inner journal 36 engages a sleeve part 38 in which there are provided inner ball grooves 39. A plurality of balls 40 each engage pairs of axially extending ball grooves 37, 39 and are held at identical distances from one another by a ball cage 41. A double-walled closing cap 42 is placed on to the end of the inner journal 36 and is axially supported in the sleeve part 38. The sleeve part 38 is welded to the journal 30 of the second ball type constant velocity fixed joint 13.

A first convoluted boot $43_5$ is positioned on the outer joint part 16 of the first ball type constant velocity fixed joint 12, on the one hand, and on the sleeve 38 of the axial plunging part 15, on the other hand, and thus closes the open annular chambers of the first ball type constant velocity fixed joint 12 and of the plunging part 15. A second convoluted boot 44 is positioned on the outer joint part 26 of the second ball type constant velocity fixed joint 13, on the one hand, and on the plug-in journal 30 of the same joint and closes the open annular chamber of same. The opening angles $\alpha_{12}$, $\alpha_{13}$ of both ball type constant velocity fixed joints, in accordance with the invention, are positioned symmetrically as regards their opening direction, i.e. they open in different directions which are opposed to the preferred torque transmitting direction. The inner joint parts and the outer joint parts of both ball type constant velocity fixed joints are arranged symmetrically relative to one another, with the outer joint parts resting against the outer ends of the driveshaft 11, so that the attaching journal $17_5$ can be inserted into a differential drive for example and the attaching journal 27 into a wheel hub.

In all embodiments shown, the ball tracks—if viewed in one direction—are undercut-free, with the center lines of the ball tracks, for example, being formed by circular arches whose centers are axially displaced by the same amounts in opposite directions relative to the joint center. Other types of ball tracks, for example having center lines composed of different curve portions can also be used for the invention.

While the invention has been described with respect to one or more embodiments, it is not intended to be limited thereto. To the contrary, the invention covers all alternatives, modifications and equivalents as may be included in the spirit and scope of the appended claims.

What is claimed is:

1. A driveshaft (11) having two ball type constant velocity fixed joints (12, 13), a shaft part (14) connecting said two joints, and an axial plunging part (15) arranged in said shaft part (14), wherein the ball type constant velocity fixed joints (12, 13) each comprise:
   a bell-shaped outer joint part (16, 26) provided with internally positioned first ball tracks (18, 28);
   a hub-shaped inner joint part (19, 29) provided with externally positioned second ball tracks (21, 31) and arranged inside said outer joint part (16, 26);
   balls (24, 34) engaging pairs of first ball tracks (18, 28) and second ball tracks (21, 31); and
   an annular ball cage (22, 32) with circumferentially distributed cage windows (23, 33) in which the balls (24, 34) are held in a common plane,
   wherein the pairs of first ball tracks (18, 28) and second ball tracks (21, 31), when viewed in a longitudinal section, form opening angles ($\alpha_{12}$, $\alpha_{13}$) with one another for controlling the balls (24, 34) in the ball tracks,
   wherein the opening angles ($\alpha_{12}$, $\alpha_{13}$) of the pairs of first ball tracks and second ball tracks at both ball type constant velocity fixed joints (12, 13) open in the same direction, and
   wherein the bell-shaped outer joint parts (16, 26) are orientated in the same direction relative to the hub-shaped inner joint parts (19, 29), with each of the opening angles ($\alpha_{12}$, $\alpha_{13}$) opening towards the open ends of the bell-shaped outer Joint parts (16, 26).

2. A driveshaft (11) having two ball type constant velocity fixed joints (12, 13), a shaft part (14) connecting said two joints, and an axial plunging part (15) arranged in said shaft part (14), wherein the ball type constant velocity fixed joints (12, 13) each comprise:
   a bell-shaped outer joint part (16, 26) provided with internally positioned first ball tracks (18, 28);
   a hub-shaped inner joint part (19, 29) provided with externally positioned second ball tracks (21, 31) and arranged inside said outer joint part (16, 26);
   balls (24, 34) engaging pairs of first ball tracks (18, 28) and second ball tracks (21, 31); and
   an annular ball cage (22, 32) with circumferentially distributed cage windows (23, 33) in which the balls (24, 34) are held in a common plane,
   wherein the pairs of first ball tracks (18, 28) and second ball tracks (21, 31), when viewed in a longitudinal section, form opening angles ($\alpha_{12}$, $\alpha_{13}$) with one another for controlling the balls (24,34) in the ball tracks,
   wherein the opening angles ($\alpha_{12}$, $\alpha_{13}$) of the pairs of first ball tracks and second ball tracks at both ball type constant velocity fixed joints (12, 13) open in the same direction, and
   wherein relative to the hub-shaped inner joint parts (19, 29), the bell-shaped outer joint parts (16, 26) are arranged symmetrically relative to one another, so as to be positioned towards the outer ends, with the opening angle ($\alpha_{12}$) at one of the ball type constant velocity fixed joints (12) opening towards the closed end of the bell-shaped outer joint part (16).

3. A driveshaft according to claim 1 or 2, wherein attaching journals (17, 27) are integrally formed on to the outer joint parts (16, 26).

4. A driveshaft according to claim 1 or 2, wherein an attaching journal is integrally connected to a base of one of the outer joint parts and the base is welded to an outer ring of the respective outer joint part.

5. A driveshaft according to claim 1 or 2, wherein attaching journals (20, 30) are inserted into the inner joint parts (19, 29).

6. A driveshaft according to claim 5, wherein one of said attaching journals (20) of the ball type constant velocity fixed joints (12, 13) is connected to an inner journal (36) of the axial plunging element (15) and the other of said attaching journals (30) is connected to a sleeve (38) of the axial plunging element (15).

7. A driveshaft according to claim 1 or 2, wherein there is provided a convoluted boot (43) which simultaneously extends over and seals an annular opening of one of the ball type constant velocity fixed joints (12) and an annular opening of the plunging element (15) in that one collar of the convoluted boot (43) is positioned on the outer joint part (16) of said one of the ball type constant velocity fixed joints (12) and in that the other collar of the convoluted boot (43) is positioned on a sleeve (38) of the axial plunging element (15).

* * * * *